(12) United States Patent
Aiyer

(10) Patent No.: US 6,261,152 B1
(45) Date of Patent: Jul. 17, 2001

(54) HETERDOYNE THICKNESS MONITORING SYSTEM

(75) Inventor: Arun A. Aiyer, Fremont, CA (US)

(73) Assignee: Nikon Research Corporation of America, Belmont, CA (US)

(*) Notice: Subject to any disclaimer, the term of this patent is extended or adjusted under 35 U.S.C. 154(b) by 0 days.

(21) Appl. No.: 09/118,306

(22) Filed: Jul. 16, 1998

(51) Int. Cl.[7] .................................................. B24B 49/00
(52) U.S. Cl. .................................................. 451/6; 356/382
(58) Field of Search .................................. 356/345, 351, 356/355, 357, 381, 382; 451/6, 5

(56) References Cited

U.S. PATENT DOCUMENTS

| | | |
|---|---|---|
| 3,790,284 | 2/1974 | Baldwin . |
| 4,360,271 | 11/1982 | Downs et al. . |
| 4,422,764 * | 12/1983 | Eastman ........................ 356/357 |
| 4,688,940 | 8/1987 | Sommargren et al. . |
| 4,883,357 | 11/1989 | Zanoni et al. . |
| 5,220,405 * | 6/1993 | Barbee et al. ................... 356/357 |
| 5,433,651 | 7/1995 | Lustig et al. . |
| 5,471,303 * | 11/1995 | Ai et al. ........................ 356/357 |
| 5,543,914 | 8/1996 | Henshaw et al. . |
| 5,959,731 * | 9/1999 | Jones ............................. 356/357 |
| 6,010,538 * | 1/2000 | Sun et al. ....................... 756/345 |
| 6,028,669 * | 2/2000 | Tzeng ............................ 356/355 |

OTHER PUBLICATIONS

Russell Targ, et al., "Coherent lidar airborne windshear sensor: performance evaluation," May 20, 1991, vol. 30, No. 15, Applied Optics, pp. 2013–2026.

* cited by examiner

Primary Examiner—Timothy V. Eley
Assistant Examiner—Dung Van Nguyen
(74) Attorney, Agent, or Firm—Skjerven Morrill MacPherson LLP

(57) ABSTRACT

A CMP heterodyne in-situ sensor (C-HIS) system utilizes optical heterodyne interferometry. A wafer undergoing CMP is illuminated through the wafer thickness using an infrared laser beam at a wavelength of 1.1 μm or greater. The beam is transmitted through the wafer and is reflected from the front wafer surface. As the wafer is polished, the optical beam path through the wafer is shortened, causing the reflected optical frequency to undergo a Doppler shift. By measuring this shift, the change in wafer thickness is determined. The frequency shift generates a signal, which enables dynamic process control. In embodiments where the wafer includes a planarization film, the frequency shift provides a measurement of changing film thickness. Embodiments of the invention utilize phase detection independent of intensity, and hence do not suffer from intensity fluctuations. Some embodiments detect thickness changes less than 2.5 nm. C-HIS sensors operate in both polished-to-thickness and polished-to-stop scenarios.

34 Claims, 2 Drawing Sheets

HETERDOYNE THICKNESS MONITORING SYSTEM

CROSS REFERENCE TO RELATED APPLICATIONS

This application is related to Coon et al., U.S. application Ser. No. 09/021,767, filed Feb. 11, 1998; Aiyer al., U.S. application Ser. No. 09/021,740, filed Feb. 11, 1998; and Aiyer et al., U.S. application Ser. No. 09/047,322 filed Mar. 24, 1998, which are incorporated herein by reference in their entirety.

BACKGROUND OF THE INVENTION

1. Field of the Invention

This invention relates generally to an apparatus and method for in-situ process monitoring and more specifically, to an apparatus and method for in-situ monitoring of chemical-mechanical planarization of semiconductor wafers.

2. Background

Planarization of the active or device surface of a substrate has become an important step in the fabrication of modern integrated circuits (ICs). Of the several methods of planarization that have been developed, Chemical Mechanical Polishing (CMP) is perhaps the most commonly used method. This popularity is due, in part, to its broad range of applicability with acceptably uniform results, relative ease of use, and low cost. However, the move to larger diameter wafers and device technologies that require constant improvement in process uniformity requires that an improved planarization system become available.

A typical CMP system uses a flat, rotating disk or platen with a pliable monolithic polishing pad mounted on its upper surface. As the disk is rotated, a slurry is deposited near the center of the polishing pad and spread outward using, at least in part, centrifugal force caused by the rotation. A wafer or substrate is then pressed, typically face down, against the working surface of the polishing pad such that the rotating polishing pad moves the slurry over the wafer's surface. In this manner, surface high spots are removed from the wafer and an essentially planar surface is achieved.

The planarization of an interlayer dielectric is one common use for CMP. As the topography of the underlying surface is not uniform, coating that surface with a dielectric film replicates or even magnifies those non-uniformities. As the surface is planarized, the high spots are removed and then the total thickness of the dielectric film is reduced to a predetermined value. Thus, the planarized dielectric film will be thinner over high points of the underlying surface than over low points of that surface. Typically, it is important to maintain a minimum dielectric thickness over each of the highest points of the underlying layer, both locally (within a die) and globally (across the wafer). Thus, uniform removal of the dielectric layer at all points of the wafer is required.

A problem with most existing CMP systems is their inability to perform in-situ thickness monitoring. As the surface of the wafer is pressed against the polishing pad during removal, typically no measurements as to the progress of the polishing can be made. Thus, wafers are either polished for fixed times, and/or periodically removed for off-line measurement. Recently, Lustig et al., U.S. Pat. No. 5,433,651 (Lustig) proposed placement of at least one viewing window in the working surface through the thickness of the polishing pad to provide access for in-situ measurement. However, a window placed in a polishing pad creates a mechanical discontinuity in the working surface each time the window passes across the surface of the wafer. A more conventional approach is to use a monolithic polishing pad.

Thus there is a need for a CMP apparatus, and method thereof, that provides optical access to the wafer front surface for continuous in-situ process monitoring, without undue process complexity or expense.

SUMMARY OF THE INVENTION

A Chemical Mechanical Polishing heterodyne in-situ sensor (C-HIS) apparatus and method for enhanced optical access to a wafer surface is provided. The C-HIS system is based on conventional optical heterodyne interferometry. In some embodiments, a front surface of the wafer is illuminated through the wafer using an infrared laser source emitting light at a wavelength of 1.1 $\mu$m or greater. In some embodiments, the wafer also comprises a planarization film. For such embodiments the front wafer surface will be understood to encompass the planarization film. Light at such wavelengths is transmitted through the wafer and planarization film to the front wafer surface, where it is at least in part reflected back to the C-HIS apparatus. As the planarization film is polished, the optical path length of the beam propagating through the film is reduced. This causes the optical frequency of the reflected beam to undergo a Doppler frequency shift. By measuring this Doppler shift, the instantaneous change in planarization film thickness can be determined. In some embodiments of the invention, the measured Doppler shift generates an input signal to enable dynamic process control.

Existing optical in-situ sensors are intensity-dependent devices and hence are subject to noise due to source intensity fluctuations and variable transmittance in the optical path. Unlike those existing in-situ sensors, the embodiments of the present invention provide for measurement based on phase detection independent of intensity, and hence do not suffer from problems related to intensity fluctuations. Some embodiments are capable of detecting thickness changes of about 2.5 nm. In accordance with embodiments of the present invention, C-HIS sensors operate in both polished-to-thickness and polished-to-stop scenarios. Thus, these embodiments provide a system and method for optically accessing a wafer surface to enable enhanced and versatile in-situ monitoring of a CMP process.

BRIEF DESCRIPTION OF THE DRAWINGS

The present invention may be better understood, and its numerous objects, features, and advantages made apparent to those skilled in the art, by referencing the accompanying drawings.

DETAILED DESCRIPTION OF THE EMBODIMENTS

As embodiments of the present invention are described with reference to the aforementioned drawings, various modifications or adaptations of the specific structures and or methods may become apparent to those skilled in the art. All such modifications, adaptations, or variations that rely upon the teachings of the present invention, and through which these teachings have advanced the art, are considered to be within the spirit and scope of the present invention.

Figure 1:
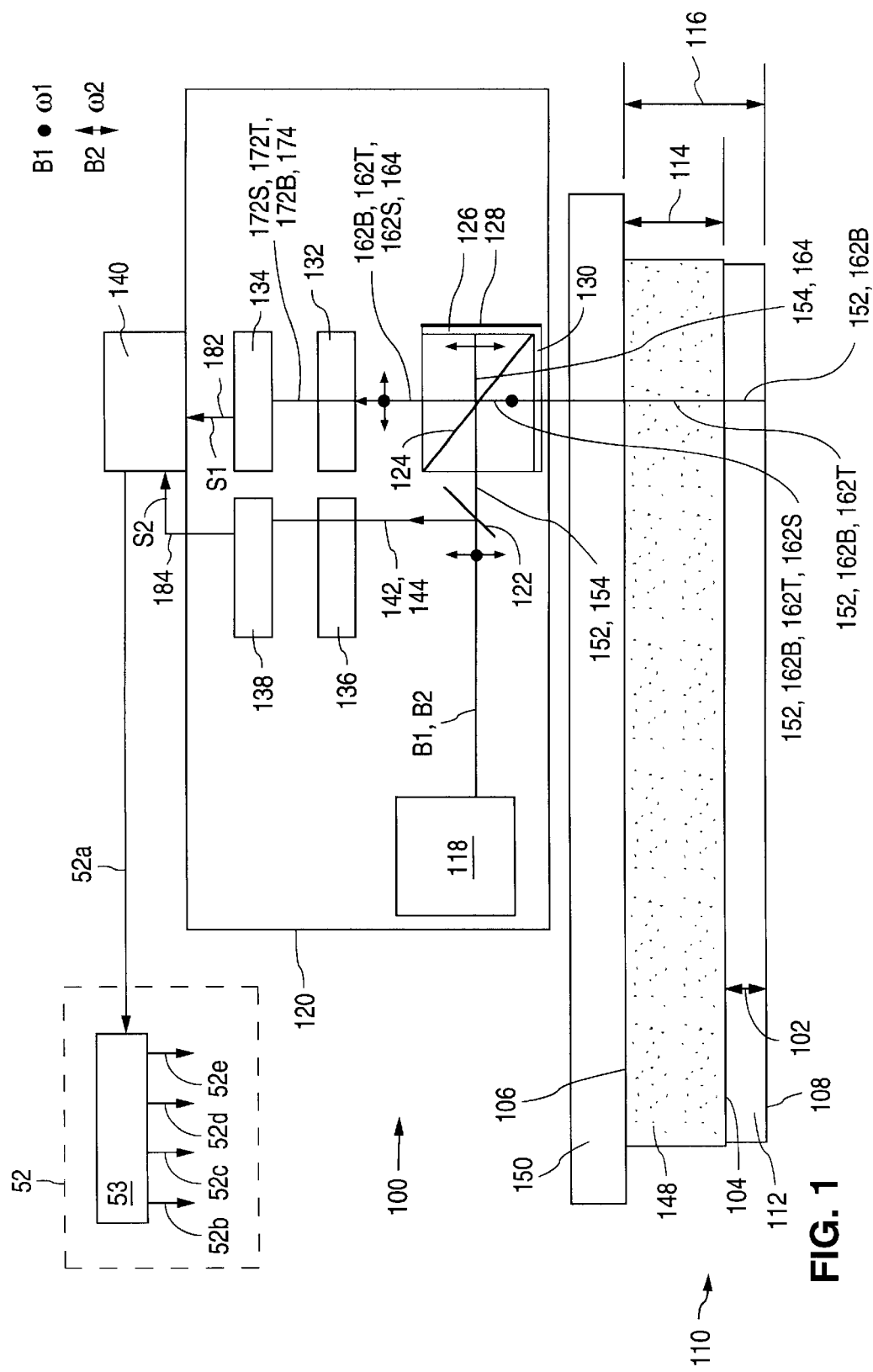
FIG. 1 is a schematic cross-sectional view showing a portion of a CMP apparatus including a wafer and a C-HIS optical assembly, in accordance with the invention.

FIG. 1 is a schematic cross-sectional view showing a portion of a Chemical Mechanical Polishing (CMP) apparatus 100 including a wafer 110 and a CMP heterodyne in-situ sensor (C-HIS) optical assembly 120, in accordance with the present invention. Wafer 110 has a front surface 108 and a back surface 106. In some embodiments, wafer 110 includes a substrate 148 and a planarization film 112. In such embodiments, film 112 is separated from substrate 148 by an interface surface (hereinafter interface 104), and front surface 108 is understood to encompass film 112 as depicted in FIG. 1. Planarization film 112 has a thickness 102 measured from interface 104 to front surface 108. Likewise a substrate thickness 114 is defined between back surface 106 and interface 104, and a wafer thickness 116 is defined between back surface 106 and front surface 108. Back surface 106 of wafer 110 is attached to a rotatable carrier 150 using conventional methods (see for example, Aiyer et al., U.S. application Ser. No. 09/047,322, filed Mar. 24, 1998). Front surface 108 is pressed downward against the working surface of a rotatable platen-mounted polishing pad (not shown). Typically a polishing slurry is applied between front surface 108 and the working surface of the polishing pad.

Optical assembly 120 comprises a laser source 118, a conventional reference beam splitter (BS) 122, a polarization beam splitter (PBS) 124, a reference beam quarter-wave plate 126, a reference beam reflector 128, a measurement beam quarter-wave plate 130, a measurement mixing polarizer 132, a measurement photodetector 134, a reference mixing polarizer 136, a reference photodetector 138, and a signal-processing assembly 140 electrically connected to the outputs of measurement photodetector 134 and reference photodetector 138 using signal leads 182 and 184 respectively. The optical arrangement is similar, for example, to that described by Sommargren et al. U.S. Pat. No. 4,688,940 issued Aug. 25, 1987 (hereinafter Sommargren). The components of optical assembly 120 are mounted above and proximate to rotatable carrier 150 to which wafer 110 is attached. In some embodiments optical assembly 120 is physically attached relative to the rotation axis of rotatable carrier 150.

Laser source 118 is configured to produce two substantially superimposed collinear beams B1 and B2 of optical frequencies $\omega_1$ and $\omega_2$ respectively. Frequency $\omega_1$ is offset from frequency $\omega_2$ by a heterodyne offset frequency $\Delta\omega$, such that $\omega_1=\omega_2+\Delta\omega$. Additionally beams B1 and B2 are orthogonally polarized; illustratively beam B1 is initially plane polarized perpendicular to the plane of FIG. 1 (shown by solid circles) and beam B2 is initially plane polarized parallel to the plane of FIG. 1 (shown by arrows). Generation of beams B1 and B2 is typically accomplished by placing an acousto-optic device (not shown) in the output beam B1 of a well-stabilized laser having a linearly polarized output of single-frequency $\omega 1$. By driving the acousto-optic device at an acoustic frequency equal to heterodyne offset frequency $\Delta\omega$, a portion of the output is shifted into an orthogonally polarized beam B2 of frequency $\omega 2$ (for example, see Sommargren).

Beams B1 and B2 propagate collinearly from laser source 118 to reference beam splitter 122, where a fraction of both beams 142 and 144, respectively, is deflected through reference mixing polarizer 136 into reference detector 138. The transmitted portions of beam B1 and beam B2 continue to propagate as beam 152 and beam 154 respectively. At polarization beam splitter (PBS) 124, beam 154 is transmitted without deflection and passes through quarter-wave plate 126, where the polarization of beam 154 is converted from plane to circular. Beam 154 is then reflected from reflector 128 back through quarter-wave plate 126 as beam 164; the circular polarization of beam 154 is converted to plane polarization for beam 164. The polarization plane of beam 164 is oriented perpendicular to the original polarization plane of beam B2. Beam 164 is then reflected from PBS 124. As can be seen, all optical elements encountered by beams B2, 154, and 164 collectively are fixed in their positions. Thus beams B2, 154, and 164 collectively traverse an optical path of fixed length.

Beam 152 is reflected from PBS 124 through quarter-wave plate 130, whereupon the polarization of beam 152 is converted from plane polarization to circular polarization. To provide optical access of beam 152 to back surface 106, it is necessary for rotatable carrier 150 to be optically transparent in whole or in part. This is accomplished, for example, by forming rotatable carrier 150 in whole or in part of transparent materials, e.g. acrylic plastic or fused silica; or alternatively by forming open slots through rotatable carrier 150 to provide an optical transmission path.

Beam 152 undergoes partial reflections at back surface 106, interface 104, and front surface 108 respectively, producing partially reflected beams 162S, 162T, and 162B respectively, which propagate back through quarter-wave plate 130. Upon transmission back through quarter-wave plate 130, the polarization of each of beams 162S, 162T, and 162B is converted from circular polarization to plane polarization; each of the respective polarization planes is perpendicular to the original polarization plane of beam B1. Reflected beams 162S, 162T, and 162B are then transmitted through PBS 124, whereupon each of beams 162S, 162T, and 162B propagates collinearly with reference beam 164. During a polishing process, planarization film thickness 102 is reduced, thereby shortening the optical path traversed by beams B1, 152, and 162B collectively. Thus beams B1, 152, and 162B collectively traverse an optical path of variable length.

The polarization planes of reference beam 164 and reflected beams 162S, 162T, 162B are each rotated 90 degrees relative to the polarization planes of their respective original beams B2 and B1. Thus reflected beams 162S, 162T, 162B are still polarized orthogonally relative to reference beam 164. Reference beam 164 and reflected beams 162S, 162T, 162B now propagate collinearly from PBS 124 onto mixing polarizer 132. Mixing polarizer 132 provides respective output beams 172S, 172T, 172B and 174 all having the same polarization (for example, see Sommargren). These similarly polarized beams 172S, 172T, 172B and 174 are then mixed on the face of the measurement photodetector 134 to produce an electrical measurement signal S1. Likewise the orthogonally polarized fractions 142 and 144, respectively, of initial beams B1 and B2 are combined by reference mixing polarizer 136 (for example, see Sommargren) and then are detected by reference photodetector 138 to produce an electrical reference signal S2.

Measurement signal S1 and reference signal S2 are applied using electrical leads 182 and 184 respectively, or by wireless means to signal processing assembly 140. Signal processing assembly 140 comprises analog and/or digital circuitry to amplify, condition, compare, and process measurement and reference signals S1, S2, respectively. Signal processing assembly 140 thereupon generates output signals representing the status of the CMP process. Optionally, signal processing assembly 140 generates output signals to provide dynamic process control, as described in detail below.

In accordance with principles of optical heterodyne interferometry familiar in the art, reference beam 174 at measurement photodetector 134 is represented by $$E1 = E_{01} e^{i(\omega_2 \cdot t)};$$

wherein
$E_{01}$ is amplitude;
t is time; and
the exponential factor represents the frequency and phase dependence of reference beam 174 having frequency $\omega_2$.

Likewise measurement beams 172S, 172T, and 172B at measurement photodetector 134 are represented respectively by $$E2 = E_{02} e^{i(\omega_1 \cdot t + \phi_S)};$$

$$E3 = E_{03} e^{i(\omega_1 \cdot t + \phi_T)};$$

and $$E4 = E_{04} e^{i(\omega_1 \cdot t + \phi_B)};$$

wherein
$E_{02}$, $E_{03}$, and $E_{04}$ are amplitudes of beams 172S, 172T and 172B, respectively; t is time; and
the exponential factors represent the frequency and phase dependencies of the above measurement beams, respectively, having frequency $\omega_1$ and undergoing optical phase shifts of $\phi_S$, $\phi_T$, and $\phi_B$ upon reflection from back surface 106, interface 104, and front surface 108 respectively.

In accordance with the principles of square-law mixing, familiar in the art, measurement signal S1 of measurement photodetector 134 arising from combined beams 174, 172S, 172T, and 172B is given by:

$$S1 \propto E^2 + 2E_{02}E_{03} \cos(\Delta\phi_{TS}) + 2E_{02}E_{04} \cos(\Delta\phi_{SB})$$

$$+ 2E_{03}E_{04} \cos(\Delta\phi_{TB}) + 2E_{01}E_{02} \cos(\Delta\omega^* t - \phi_S) + 2E_{01}E_{03} \cos(\Delta\omega^* t - \phi_T) + 2E_{01}E_{04} \cos(\Delta\omega^* t - \phi_B);$$

wherein $$E^2 = E_{01}^2 + E_{02}^2 + E_{03}^2 + E_{04}^2;$$

$$\Delta\phi_{TS} = \phi_T - \phi_S;$$

$$\Delta\phi_{SB} = \phi_S - \phi_B;$$

and $$\Delta\phi_{TB} = \phi_T - \phi_B.$$

The first two terms of measurement signal S1 are time invariant terms. The third and fourth terms will change in magnitude as the film is polished. The consequence of this magnitude change is a change in signal contrast. The fifth and sixth terms are heterodyne terms, but do not undergo any Doppler shift, since phases $\phi_S$ and $\phi_T$ do not change during a polishing operation. The last term of measurement signal S1 is the only heterodyne term that undergoes a Doppler frequency shift during the polishing process.

Reference signal S2, generated by reference photodetector 138, is represented by $$S2 \propto 4 + 4 \cos(\Delta\omega^* t),$$

which depends on heterodyne offset frequency $\Delta\omega$, but does not undergo a phase shift.

Figure 2:
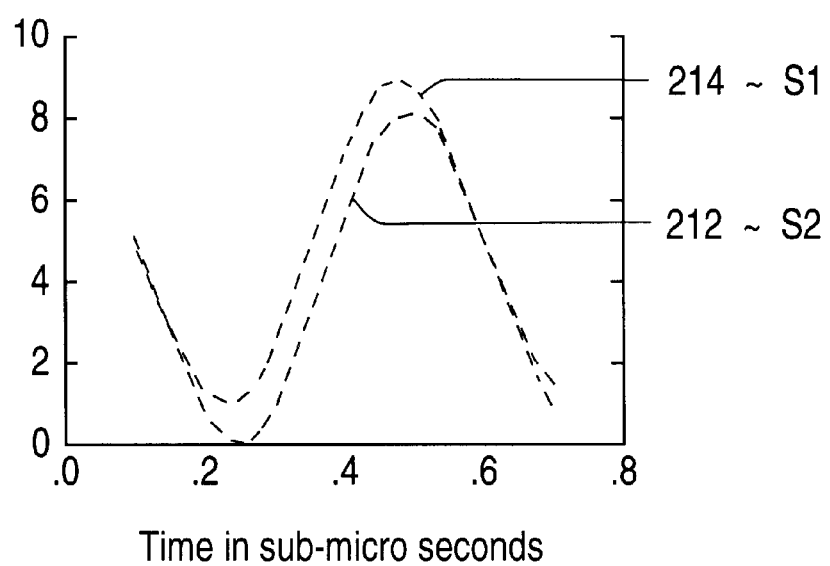
FIG. 2 is a plot of a simulation of measurement and reference signals, in accordance with the invention.

Illustratively, FIG. 2 is a plot of a simulation of measurement and reference signals S1 and S2 respectively, normalized to an arbitrary vertical scale. The horizontal axis represents time in fractional microseconds. A lower plot 212 represents reference signal S2; an upper plot 214 represents measurement signal S1. For convenience of simulation, a 2-MHz heterodyne frequency $\Delta\omega$ is assumed. The shift between plots 212 and 214 is equivalent to a change in planarization film thickness 102 of about 10 nm.

Thus, in accordance with the invention, signals are generated by an in-situ method, that provide sensitive, accurate, and fluctuation-free measurement of film thickness change during a polishing process. In this manner, the thickness 102 of planarization film 112, as it approaches a predetermined value, is determined without the need to stop the polishing process.

Optionally, the apparatus depicted in FIG. 1 also incorporates a dynamic feedback system 52 for routing a signal 52a from signal processing assembly 140 to a computing device 53. In embodiments of the present invention, signal 52a is a signal derived from C-HIS optical assembly 120 that represents the thickness 102 of planarization film 112 on wafer 110. Typically, signal 52a is routed from signal processing assembly 140 through dynamic feedback system 52 which includes computing device 53.

In some embodiments of the present invention, computing device 53 is a general purpose computing device having software routines encoded within its memory for receiving, and evaluating input signals such as signal 52a. In some embodiments, computing device 53 is an application specific computing device, essentially hardwired for a specific purpose. In some embodiments, device 53 is a combination of general purpose and specific purpose computing devices. Regardless of form, device 53 receives one or more input signals 52a and, using encoded routines, generates a result as one or more output signals 52b, 52c, 52d, and 52e. Each output signal 52b, 52c, 52d, and 52e can be a control signal for providing dynamic process control of one or more of the various sub-systems of CMP apparatus 100.

Illustratively, an input signal 52a from C-HIS optical assembly 120 enables computing device 53 to continuously calculate a rate of removal of planarization film 112. In turn, process variables, for example platen drive speed, platen pressure, slurry supply, and/or rotatable carrier motion are each dynamically controlled based upon the input signal 52a and rate calculated by computer device 53. In some embodiments, one or more of output signals 52b–52e are informational display or alert signals intended to call the attention of a human operator rather than dynamic control signals. For example, in some embodiments of the invention, computing device 53 produces an output signal 52b–52e that planarization film thickness 102 is approaching or reaching a predetermined value.

In addition to receiving and evaluating input signals 52a from C-HIS optical assembly 120, computing device 53 is also capable of receiving process programming inputs from human operators or from other computing devices (not shown). In this manner, computing device 53 is used to control essentially all functions of CMP apparatus 100.

In view of the foregoing, it will be realized that embodiments of the present invention have been described, wherein an improved planarization system has been enabled. Embodiments of the present invention allow improved optical access to the active surface being polished, as compared to prior art systems, thus allowing continuous in-situ monitoring of the process, for example thickness and end point detection, as well as dynamic process control.

Although the invention has been described in terms of a certain preferred embodiment, other embodiments apparent to those skilled in the art are also within the scope of this invention. Accordingly, the scope of the invention is intended to be defined only by the claims which follow.

What is claimed is:

1. A system for thickness monitoring of a semiconductor wafer having a front surface, a back surface opposite the front surface, an interface surface between said front and back surfaces, and a layer thickness measured between said interface and front surfaces, the system comprising:

an assembly incorporating a laser source configured to generate (a) a first laser beam at substantially a first optical frequency and (b) a second laser beam at substantially a second optical frequency different from the first frequency, said semiconductor wafer being disposed in a first optical path over which said first laser beam is propagated as said wafer undergoes chemical-mechanical polishing along said front surface;

a rotatable carrier having at least a partially optically transparent portion attached to said back surface with said first optical path passing through said optically transparent portion; and a measurement photodetector (a) disposed in said first optical path to receive light of said first laser beam after that light of said first laser beam has reflected off at least said front surface, (b) configured to receive light of said second laser beam controlled to avoid being significantly reflected off said front surface, and (c) having an output terminal that provides a measurement output signal which varies (c1) with said layer thickness and (c2) with time as a function of the difference between the frequencies of said laser beams.

2. The system according to claim 1, wherein said semiconductor wafer is disposed in said first optical path such that said back surface is oriented toward said laser source.

3. The system according to claim 2, wherein said semiconductor wafer and said measurement photodetector are disposed in said first optical path such that said back surface is oriented toward said measurement photodetector.

4. The system according to claim 1, wherein the wavelength of said first laser beam is greater than or equal to 1.1 $\mu$m.

5. The system according to claim 4, wherein said semiconductor wafer is at least partially optically transparent at wavelengths of greater than or equal to 1.1 $\mu$m.

6. The system according to claim 4, wherein said rotatable carrier is at least partially optically transparent at wavelengths of greater than or equal to 1.1 $\mu$m.

7. The system according to claim 1, wherein said semiconductor wafer comprises a substrate and a planarization film layer adjoining said substrate and having a material composition differing from that of said substrate, said interface surface separating said planarization film layer from said substrate.

8. The system according to claim 7, wherein said planarization film layer is at least partially optically transparent at wavelengths of greater than or equal to 1.1 $\mu$m.

9. The system according to claim 1, further comprising a dynamic feedback system having an input terminal interconnected with said output terminal of said first photodetector.

10. The system according to claim 1, wherein said first optical path of said first laser beam is a measurement path, and said first laser beam is split to form a second optical path as a reference path different from said measurement path.

11. The system according to claim 10, wherein said second laser beam is also split such that one part of said second laser beam follows said reference path and another part of said second laser beam follows part of said measurement path separate from said semiconductor wafer.

12. The system according to claim 10, wherein said first and second laser beams are collinear and substantially superimposed on each other as they leave said laser source.

13. The system according to claim 12, wherein said first and second laser beams are substantially orthogonally polarized as they leave said laser source.

14. The system according to claim 1, wherein said measurement output signal comprises a measurement signal component which varies with time at a frequency that differs from the difference between said first and second frequencies by an amount dependent on how fast said layer thickness decreases.

15. A system for thickness monitoring of a semiconductor wafer having a front surface, a back surface opposite the front surface, and a wafer thickness measured between the front and back surfaces, the system comprising:

a laser source which generates (a) a first laser beam at substantially a first optical frequency and (b) a second laser beam at substantially a second optical frequency different from the first frequency;

a carrier which receives the wafer along its back surface as the wafer thickness is changed by chemically-mechanically polishing the wafer along its front surface; and a measurement photodetector which (a) receives light of the first laser beam after that light of the first laser beam has been reflected off at least the wafer's front surface, (b) receives light of the second laser beam controlled so as to avoid being significantly reflected off the wafer's front surface, and (c) provides a measurement output signal which varies (c1) with the wafer thickness and (c2) with time as a function of the difference between the frequencies of the laser beams.

16. The system according to claim 15, wherein the measurement output signal comprises a measurement signal component which varies with time at a frequency that differs from the difference between the frequencies of the laser beams by an amount dependent on how fast the wafer thickness changes.

17. The system according to claim 15, further including a reference photodetector which (a) receives further light of both laser beams controlled so as to avoid being reflected off the wafer's front surface and (b) provides a reference output signal which varies with time as a function of the difference between the frequencies of the laser beams substantially independent of the wafer thickness.

18. The system according to claim 17, wherein:

the measurement output signal comprises a measurement signal component which varies with time at a frequency that differs from the difference between the frequencies of the laser beams by an amount dependent on how fast the wafer thickness changes; and the reference output signal comprises a reference signal component which varies with time substantially at a frequency equal to the difference between the frequencies of the laser beams.

19. The system according to claim 17, further including a signal processor that compares the measurement and reference output signals.

20. The system according to claim 19, further including a dynamic feedback system responsive to at least one signal supplied from the signal processor for generating at least one signal to control how fast the wafer thickness changes.

21. The system according to claim 17, further including a reference beam splitter for splitting light of the laser beams to be received by the reference photodetector from light of the laser beams to be received by the measurement photodetector.

22. The system according to claim 15, wherein the laser beams are substantially collinear and orthogonally polarized as they leave the laser source.

23. The system according to claim 22, further including a polarization beam splitter for splitting light of the second laser beam to be received by the measurement photodetector from light of the first laser beam to be received by the measurement photodetector.

24. The system according to claim 23, where at least part of the light of the first laser beam received by the measurement photodetector passes largely fully through the semiconductor wafer before being reflected off its front surface.

25. The system according to claim 15, wherein at least part of the light of the first laser beam received by the measurement photodetector travels an optical path whose length varies with the wafer thickness.

26. The system according to claim 25, wherein the light of the second laser beam received by the measurement photodetector travels an optical path of largely fixed length.

27. The system according to claim 15, wherein the semiconductor wafer comprises a substrate and a planarization layer adjoining the substrate and having an outer surface that forms the wafer's front surface, whereby the planarization layer is of a thickness that decreases during the chemical-mechanical polishing.

28. The system according to claim 15, wherein the semiconductor wafer is at least partially optically transparent at wavelength of at least 1.1 $\mu$m.

29. A system for thickness monitoring of a body having a front surface, a back surface opposite the front surface, and a thickness measured between the front and back surfaces, the system comprising:

a laser source which generates (a) a first laser beam at substantially a first optical frequency and (b) a second laser beam at substantially a second optical frequency different from the first frequency;

a carrier which receives the body along its back surface; and a measurement photodetector which (a) receives light of the first laser beam after that light of the first laser beam has been reflected off at least the body's front surface, (b) receives light of the second laser beam controlled so as to avoid being significantly reflected off the body's front surface, and (c) provides a measurement output signal which varies (c1) with the body's thickness and (c2) with time as a function of the difference between the frequencies of the laser beams.

30. The system according to claim 29, wherein, for change in the body's thickness, the measurement output signal comprises a measurement signal component which varies with time at a frequency that differs from the difference between the frequencies of the laser beams by an amount dependent on how fast the body's thickness chances.

31. The system according to claim 29, further including a reference photodetector which (a) receives further light of both laser beams controlled so as to avoid being reflected off the body's front surface and (b) provides a reference output signal which varies with time as a function of the difference between the frequencies of the laser beams substantially independent of the body's thickness.

32. The system according to claim 31, wherein, for change in the body's thickness:

the measurement output signal comprises a measurement signal component which varies with time at a frequency that differs from the difference between the frequencies of the laser beams by an amount dependent on how fast the body's thickness changes; and the reference output signal comprises a reference signal component which varies with time substantially at a frequency equal to the difference between the frequencies of the laser beams.

33. The system according to claim 29, wherein the laser beams are substantially collinear and orthogonally polarized as they leave the laser source.

34. The system according to claim 33, further including:

a reference beam splitter for splitting light of the laser beams to be received by the reference photodetector from light of the laser beams to be received by the measurement photodetector; and a polarization beam splitter for splitting light of the second laser beam to be received by the measurement photodetector from light of the first laser beam to be received by the measurement photodetector.

* * * * *

UNITED STATES PATENT AND TRADEMARK OFFICE
CERTIFICATE OF CORRECTION

PATENT NO.    : 6,261,152 B1
DATED         : July 17, 2001
INVENTOR(S)   : Arun A. Aiyer It is certified that error appears in the above-identified patent and that said Letters Patent is hereby corrected as shown below:

Column 10,
Line 13, please delete "chances" and insert -- changes --.

Signed and Sealed this

Twenty-eighth Day of January, 2003

JAMES E. ROGAN
*Director of the United States Patent and Trademark Office*